3,124,573
2-FORMYL CORTICOIDS
Albert Bowers and John Edwards, Mexico City, Mexico, assignors, by mesne assignments, to Syntex Corporation, a corporation of Panama
No Drawing. Filed Dec. 4, 1961, Ser. No. 156,958
21 Claims. (Cl. 260—239.55)

The present invention relates to novel cyclopentanophenanthrene derivatives and to a process for the production thereof.

More particularly the present invention relates to 2-formyl-$\Delta^1$-derivatives of cortical hormones.

The novel compounds of the present invention are represented by the following formulas:

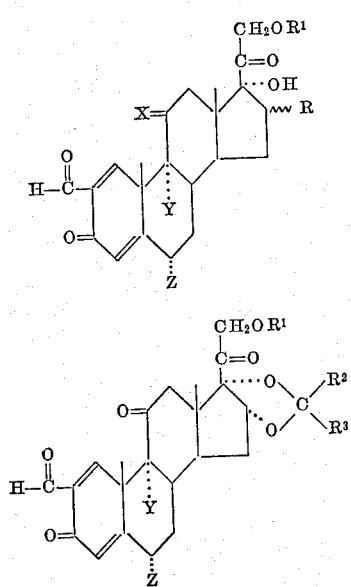

In the above formulas X represents $\beta$-hydroxy or keto; Y represents hydrogen, fluorine or chlorine; Z represents hydrogen, fluorine, chlorine or methyl; R represents hydrogen, 16$\alpha$-methyl, 16$\beta$-methyl or the group $-OR^1$ in the 16$\alpha$-position; $R^1$ represents hydrogen or an acyl group. The acyl group is derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t - butylacetate, phenoxyacetate, cyclopentylpropionate, aminoaceate and $\beta$-chloropropionate. $R^2$ and $R^3$ represent the residue of a hydrocarbon of up to 8 carbon atoms of straight, branched, cyclic or mixed aliphatic-cyclic chain, saturated or unsaturated including aromatic groups.

The compounds represented by the above formulas have high anti-inflammatory properties and also exhibit glucocorticoid, thymolytic and anti-estrogenic activities with low incidence of side effects. These compounds are not ulcerogenic and do not give rise to psychoses or stimulate appetite.

The novel compounds of the present invention are prepared by the process illustrated by the following equation:

In the above formulas, R, $R^1$ and Z have the same meaning as previously set forth; W represents fluorine or chlorine.

In practicing the process outlined above, the starting compound which is a hydrocortisone derivative (I; R¹=H) is treated with formaldehyde in the presence of an acid such as hydrochloric acid to furnish the 17,20;20,21-bis-methylenedioxy derivative thereof (II). This derivative is treated with ethyl formate in the presence of an alkali metal hydride, such as sodium hydride in a solvent inert to the reagent, preferably benzene; the organic sodium salt thus formed is hydrolyzed in an acid medium such as dilute hydrochloric acid, yielding the corresponding 2 - hydroxymethylene - 17,20;20,21 - bismethylenedioxy-hydrocortisone derivative (III). The last named compound is treated with a suitable dehydrogenating agent, preferably 2,3-dichloro-5,6-dicyano-1,4-benzoquinone in a suitable solvent such as dioxane at room temperature for a period of time of the order of two minutes, thus affording the respective 2-formyl-17,20;20,21-bismethylenedioxy Δ$^{1,4}$-pregnadiene derivative (IV). Conventional hydrolysis of this compound in an acid medium such as 60% formic acid yields the corresponding 2-formyl-Δ$^{1,4}$-pregnadiene - 11β,17α,21 - triol - 3,20 - dione derivative (V; R¹=H). Conventional acylation of this compound in pyridine with an acylating agent, as for example, acetic anhydride, furnishes the corresponding acylate of the last named compound (V; R¹=acyl). Dehydration of this derivative with a suitable agent, such as mesyl chloride in dimethylformamide-pyridine yields the respective 2-formyl-Δ$^{1,4,9(11)}$-pregnatriene-17α,21-diol-3,20-dione compound (VI; R¹=acyl). Treatment of this compound with N-bromoacetamide in the presence of a mild acid such as perchloric acid affords the corresponding 2-formyl-9α-bromo-Δ$^{1,4}$-pregnadiene-11β,17α,21-triol-3,20-dione derivative which upon reaction in a mild basic medium, preferably potassium acetate in acetone, furnishes the respective 2-formyl-9β,11β-oxido-Δ$^{1,4}$-pregnadiene compound. The opening of the 9β,11β-oxide ring with hydrogen fluoride or hydrogen chloride leads to the formation of the corresponding 9α-fluoro or chloro-11β-hydroxy compound (VII; R¹=acyl). Oxidation of the 11β-hydroxyl of this 9α-halo derivative and of the 11β-hydroxy 9α-unsubstituted derivative (V; R¹=acyl), preferably with chromium trioxide in pyridine furnishes the corresponding 11-ketones (VIII and IX; R¹=acyl).

Conventional saponification of the above obtained acylates of the 11β-hydroxy and 11-keto compounds (V, VII, VIII, IX; R¹=acyl) with potassium hydroxide, yields the respective free alcohols (V, VII, VIII, IX; R¹=H).

Where in the above compounds R is hydroxy, acylation at C-21 and C-16 occurs simultaneously and saponification of the diacylates yields the respective 16α,21-diols.

Subsequent conventional acylation of these alcohols in pyridine with a suitable acylating agent such as an anhydride of a hydrocarbon carboxylic acid of the type described previously furnishes the corresponding acylates (V, VII, VIII, IX; R¹=acyl) wherein the acyl group may be other than the group previously saponified.

The 16α,17α-ketonide derivatives of the present invention are prepared by the process illustrated by the following equation:

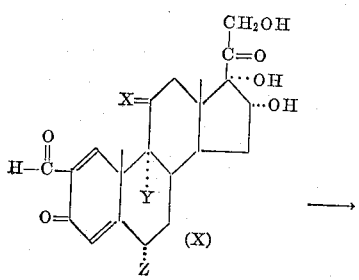

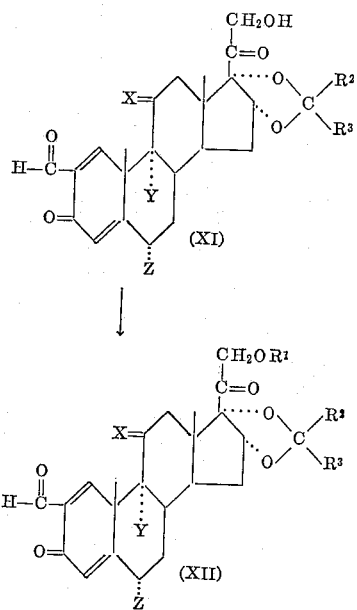

In the above formula X, Y, Z, R¹, R² and R³ have the same meaning as previously set forth.

In practicing the process just outlined, the starting compound which is a 2-formyl-16α-hydroxy-Δ¹-cortisone derivative (X) is condensed with a ketone, as for example acetone, methyl ethyl ketone, cyclohexanone or acetophenone, in the presence of a mild acid such as perchloric acid to give the corresponding 16α,17α-methylenedioxy derivative (XI). This compound upon conventional acylation in pyridine with an acylating agent, such as an anhydride of a hydrocarbon carboxylic acid of the type described above, thus yields the corresponding 21-acylate (XII; R¹=acyl).

The following examples serve to illustrate but are not intended to limit this invention:

*Example I*

A solution of 5 g. of 6α,16β-dimethyl-Δ⁴-pregnene-11β,17α,21-triol-3,20-dione in 40 cc. of 37% aqueous formaldehyde was treated with 0.5 cc. of concentrated hydrochloric acid and the mixture stirred for 48 hours at room temperature. It was then poured into water, the formed precipitate filtered off, washed with water to neutral and dried under vacuum, thus affording 6α,16β-dimethyl-17,20;20,21-bismethylenedioxy-Δ⁴ - pregnen-11β-ol-3-one.

When applying the above described procedure to the starting compounds listed below, there were obtained the corresponding products hereinafter set forth:

| Starting compounds | Products |
| --- | --- |
| 16α-methyl-6α-fluoro-Δ⁴-pregnene-11β,17α,21-triol-3,20-dione. | 16α-methyl-6α-fluoro-17,20;20,21-bismethylenedioxy-Δ⁴-pregnen-11β-ol-3-one. |
| 16α-methyl-6α-chloro-Δ⁴-pregnene-11β,17α,21-triol-3,20-dione. | 16α-methyl-6α-chloro-17,20;20,21-bismethylenedioxy-Δ⁴-pregnen-11β-ol-3-one. |
| 16β-methyl-6α-fluoro-Δ⁴-pregnene-11β,17α, 21-triol-3,20-dione. | 16β-methyl-6α-fluoro-17,20;20,21-bismethylenedioxy-Δ⁴-pregnen-11β-ol-3-one. |
| 6α-fluoro-Δ⁴-pregnene-11β,16α 17α,21-tetrol-3,20-dione. | 6α-fluoro-17,20;20,21-bismethyl-enedioxy-Δ⁴-pregnene-11β,16α-diol-3-one. |
| 6α-chloro-Δ⁴-pregnene-11β-16α,17α, 21-tetrol-3,20-dione. | 6α-chloro-17,20;20,21-bismethyl-enedioxy-Δ⁴-pregnene-11β,16α-diol-3-one. |
| 6α-chloro-hydrocortisone | 6α-chloro-17,20;20,21-bismethyl-enedioxy-Δ⁴-pregnen-11β-ol-3-one. |
| hydrocortisone | 17,20;20,21-bismethylenedioxy-Δ⁴-pregnen-11β-ol-3-one. |

*Example II*

To a solution of 6α,16β-dimethyl-17,20;20,21-bismethylenedioxy-Δ⁴-pregnen-11β-ol-3-one in 60 cc. of anhydrous benzene, there was added 3 cc. of ethyl formate and 1.3 g. of sodium hydride, suspended in mineral oil while cooling and stirring under an atmosphere of nitrogen. The mixture was stirred for 24 hours at room temperature, hexane was added until complete precipitation, the solid was collected and dried under vacuum. The crude material was suspended in dilute aqueous hydrochloric acid and stirred at room temperature for half an hour. The precipitate was collected, washed with water and dried. Recrystallization from methylene chloride-hexane gave 2 - hydroxymethylene - $6\alpha,16\beta$-dimethyl-17,20;20,21-bismethylenedioxy-$\Delta^4$-pregnen-11$\beta$-ol-3-one.

The starting compounds listed below were treated following the above procedure, thus furnishing the corresponding products hereinafter set forth:

| Starting compounds | Products |
| --- | --- |
| 16$\alpha$-methyl-6$\alpha$-fluoro-17,20;20,21-bismethylenedioxy-$\Delta^4$-pregnen-11$\beta$-ol-3-one. | 2-hydroxymethylene-16$\alpha$-methyl-6$\alpha$-fluoro-17,20;20,21-bismethylenedioxy-$\Delta^4$-pregnen-11$\beta$-ol-3-one. |
| 16$\alpha$-methyl-6$\alpha$-chloro-17,20;20,21-bismethylenedioxy-$\Delta^4$-pregnen-11$\beta$-ol-3-one. | 2-hydroxymethylene-16$\alpha$-methyl-6$\alpha$-chloro-17,20;20,21-bismethylenedioxy-$\Delta^4$-pregnen-11$\beta$-ol-3-one. |
| 16$\beta$-methyl-6$\alpha$-fluoro-17,20;20,21-bismethylenedioxy-$\Delta^4$-pregnen-11$\beta$-ol-3-one. | 2-hydroxymethylene-16$\beta$-methyl-6$\alpha$-fluoro-17,20;20,21-bismethylenedioxy-$\Delta^4$-pregnen-11$\beta$-ol-3-one. |
| 6$\alpha$-fluoro-17,20;20,21-bismethylenedioxy-$\Delta^4$-pregnene-11$\beta$,16$\alpha$-diol-3-one. | 2-hydroxymethylene-6$\alpha$-fluoro-17,20;20,21-bismethylenedioxy-$\Delta^4$-pregnene-11$\beta$,16$\alpha$-diol-3-one. |
| 6$\alpha$-chloro-17,20;20,21-bismethylenedioxy-$\Delta^4$-pregnene-11$\beta$,16$\alpha$-diol-3-one. | 2-hydroxymethylene-6$\alpha$-chloro-17,20;20,21-bismethylenedioxy-$\Delta^4$-pregnene-11$\beta$,16$\alpha$-diol-3-one. |
| 6$\alpha$-chloro-17,20;20,21-bismethylenedioxy-$\Delta^4$-pregnen-11$\beta$-ol-3-one. | 2-hydroxymethylene-6$\alpha$-chloro-17,20;20,21-bismethylenedioxy-$\Delta^4$-pregnen-11$\beta$-ol-3-one. |
| 17,20;20,21-bismethylenedioxy-$\Delta^4$-pregnen-11$\beta$-ol-3-one. | 2-hydroxymethylene-17,20;20,21-bismethylenedioxy-$\Delta^4$-pregnen-11$\beta$-ol-3-one. |

*Example III*

A mixture of 2 g. of 2,3-dichloro-5,6-dicyano-1,4-benzoquinone in 20 cc. of dioxane was added to a solution of 2 g. of 2-hydroxymethylene-6$\alpha$,16$\beta$-dimethyl-17,20;20,21-bismethylenedioxy-$\Delta^4$-pregnen-11$\beta$-ol-3-one in 30 cc. of dioxide at room temperature. After 2 minutes at room temperature, the reaction mixture was diluted with 150 cc. of methylene chloride and then filtered to remove the precipitate of dichlorodicyanohydroquinone. The filtrate was adsorbed onto 80 g. of alumina. Elution and crystallization of the solid portions from acetone-hexane afforded 2 - formyl - 6$\alpha$,16$\beta$ - dimethyl - 17,20;20,21 - bismethylenedioxy-$\Delta^{1,4}$-pregnadien-11$\beta$-ol-3-one.

When applying the above technique to the starting compounds listed below, there were obtained the corresponding products hereinafter set forth:

| Starting compounds | Products |
| --- | --- |
| 2-hydroxymethylene-16$\alpha$-methyl-6$\alpha$-fluoro-17,20;20,21-bismethylenedioxy-$\Delta^4$-pregnen-11$\beta$-ol-3-one. | 2-formyl-16$\alpha$-methyl-6$\alpha$-fluoro-17,20;20,21-bismethylenedioxy-$\Delta^{1,4}$-pregnadien-11$\beta$-ol-3-one. |
| 2-hydroxymethylene-16$\alpha$-methyl-6$\alpha$-chloro-17,20;20,21-bismethylenedioxy-$\Delta^4$-pregnen-11$\beta$-ol-3-one. | 2-formyl-16$\alpha$-methyl-6$\alpha$-chloro-17,20;20,21-bismethylenedioxy-$\Delta^{1,4}$-pregnadien-11$\beta$-ol-3-one. |
| 2-hydroxymethylene-16$\beta$-methyl-6$\alpha$-fluoro-17,20;20,21-bismethylenedioxy-$\Delta^4$-pregnen-11$\beta$-ol-3-one. | 2-formyl-16$\beta$-methyl-6$\alpha$-fluoro-17,20;20,21-bismethylenedioxy-$\Delta^{1,4}$-pregnadien-11$\beta$-ol-3-one. |
| 2-hydroxymethylene-6$\alpha$-fluoro-17,20;20,21-bismethylenedioxy-$\Delta^4$-pregnene-11$\beta$,16$\alpha$-diol-3-one. | 2-formyl-6$\alpha$-fluoro-17,20;20,21-bismethylenedioxy-$\Delta^{1,4}$-pregnadiene-11$\beta$,16$\alpha$-diol-3-one. |
| 2-hydroxymethylene-6$\alpha$-chloro-17,20;20,21-bismethylenedioxy-$\Delta^4$-pregnene-11$\beta$,16$\alpha$-diol-3-one. | 2-formyl-6$\alpha$-chloro-17,20;20,21-bismethylenedioxy-$\Delta^{1,4}$-pregnadiene-11$\beta$,16$\alpha$-diol-3-one. |
| 2-hydroxymethylene-6$\alpha$-chloro-17,20;20,21-bismethylenedioxy-$\Delta^4$-pregnen-11$\beta$-ol-3-one. | 2-formyl-6$\alpha$-chloro-17,20;20,21-bismethylenedioxy-$\Delta^{1,4}$-pregnadien-11$\beta$-ol-3-one. |
| 2-hydroxymethylene-17,20;20,21-bismethylenedioxy-$\Delta^4$-pregnen-11$\beta$-ol-3-one. | 2-formyl-17,20;20,21-bismethylenedioxy-$\Delta^{1,4}$-pregnadien-11$\beta$-ol-3-one. |

*Example IV*

1 g. of 2-formyl-6$\alpha$,16$\beta$-dimethyl-17,20;20,21-bismethylenedioxy-$\Delta^{1,4}$-pregnadien-11$\beta$-ol-3-one was heated on the steam bath with 20 cc. of 60% formic acid for 30 minutes, cooled, diluted with water and the precipitate was collected, washed with water, dried and recrystallized from acetone-hexane, thus affording 2-formyl-6$\alpha$,16$\beta$-dimethyl-$\Delta^{1,4}$-pregnadiene-11$\beta$,17$\alpha$,21-triol-3,20-dione.

The starting compounds listed below were treated by the above described technique furnishing the corresponding products disclosed hereinafter:

| Starting compounds | Products |
| --- | --- |
| 2-formyl-16$\alpha$-methyl-6$\alpha$-fluoro-17,20;20,21-bismethylenedioxy-$\Delta^{1,4}$-pregnadien-11$\beta$-ol-3-one. | 2-formyl-16$\alpha$-methyl-6$\alpha$-fluoro-$\Delta^{1,4}$-pregnadiene-11$\beta$,17$\alpha$,21-triol-3,20-dione. |
| 2-formyl-16$\alpha$-methyl-6$\alpha$-chloro-17,20;20,21-bismethylenedioxy-$\Delta^{1,4}$-pregnadien-11$\beta$-ol-3-one. | 2-formyl-16$\alpha$-methyl-6$\alpha$-chloro-$\Delta^{1,4}$-pregnadiene-11$\beta$,17$\alpha$,21-triol-3,20-dione. |
| 2-formyl-16$\beta$-methyl-6$\alpha$-fluoro-17,20;20,21-bismethylenedioxy-$\Delta^{1,4}$-pregnadien-11$\beta$-ol-3-one. | 2-formyl-16$\beta$-methyl-6$\alpha$-fluoro-$\Delta^{1,4}$-pregnadiene-11$\beta$,17$\alpha$,21-triol-3,20-dione. |
| 2-formyl-6$\alpha$-fluoro-17,20;20,21-bismethylenedioxy-$\Delta^{1,4}$-pregnadiene-11$\beta$,16$\alpha$-diol-20-one. | 2-formyl-6$\alpha$-fluoro-$\Delta^{1,4}$-pregnadiene-11$\beta$,16$\alpha$,17$\alpha$,21-tetrol-3,20-dione. |
| 2-formyl-6$\alpha$-chloro-17,20;20,21-bismethylenedioxy-$\Delta^{1,4}$-pregnadiene-11$\beta$,16$\alpha$-diol-3-one. | 2-formyl-6$\alpha$-chloro-$\Delta^{1,4}$-pregnadiene-11$\beta$,16$\alpha$,17$\alpha$,21-tetrol-3,20-dione. |
| 2-formyl-6$\alpha$-chloro-17,20;20,21-bismethylenedioxy-$\Delta^{1,4}$-pregnadien-11$\beta$-ol-3-one. | 2-formyl-6$\alpha$-chloro-$\Delta^{1,4}$-pregnadiene-11$\beta$,17$\alpha$,21-triol-3,20-dione. |
| 2-formyl-17,20;20,21-bismethylenedioxy-$\Delta^{1,4}$-pregnadien-11$\beta$-ol-3-one. | 2-formyl-$\Delta^{1,4}$-pregnadiene-11$\beta$,17$\alpha$,21-triol-3,20-dione. |

*Example V*

A mixture of 1 g. of 2-formyl-6$\alpha$,16$\beta$-dimethyl-$\Delta^{1,4}$-pregnadiene-11$\beta$,17$\alpha$,21-triol-3,20-dione, 4 cc. of pyridine and 2 cc. of acetic anhydride was kept at room temperature overnight, poured into ice water, and the formed precipitate was filtered, washed with water and dried. Crystallization from acetone-hexane gave 2-formyl-6$\alpha$,16$\beta$-dimethyl - $\Delta^{1,4}$ - pregnadiene - 11$\beta$,17$\alpha$,21 - triol- 3,20-dione-21-acetate.

By the same procedure, there were treated the starting materials listed below, affording the corresponding products hereinafter disclosed:

| Starting compounds | Products |
| --- | --- |
| 2-formyl-16$\alpha$-methyl-6$\alpha$-fluoro-$\Delta^{1,4}$-pregnadiene-11$\beta$,17$\alpha$,21-triol-3,20-dione. | 2-formyl-16$\alpha$-methyl-6$\alpha$-fluoro-$\Delta^{1,4}$-pregnadiene-11$\beta$,17$\alpha$,21-triol-3,20-dione-21-acetate. |
| 2-formyl-16$\alpha$-methyl-6$\alpha$-chloro-$\Delta^{1,4}$-pregnadiene-11$\beta$,17$\alpha$,21-triol-3,20-dione. | 2-formyl-16$\alpha$-methyl-6$\alpha$-chloro-$\Delta^{1,4}$-pregnadiene-11$\beta$,17$\alpha$,21-triol-3,20-dione-21-acetate. |
| 2-formyl-16$\beta$-methyl-6$\alpha$-fluoro-$\Delta^{1,4}$-pregnadiene-11$\beta$,17$\alpha$,21-triol-3,20-dione. | 2-formyl-16$\beta$-methyl-6$\alpha$-fluoro-$\Delta^{1,4}$-pregnadiene-11$\beta$,17$\alpha$,21-triol-3,20-dione-21-acetate. |
| 2-formyl-6$\alpha$-fluoro-$\Delta^{1,4}$-pregnadiene-11$\beta$,16$\alpha$,17$\alpha$,21-tetrol-3,20-dione. | 2-formyl-6$\alpha$-fluoro-$\Delta^{1,4}$-pregnadiene-11$\beta$,16$\alpha$,17$\alpha$,21-tetrol-3,20-dione-16$\alpha$,21-diacetate. |
| 2-formyl-6$\alpha$-chloro-$\Delta^{1,4}$-pregnadiene-11$\beta$,16$\alpha$,17$\alpha$,21-tetrol-3,20-dione. | 2-formyl-6$\alpha$-chloro-$\Delta^{1,4}$-pregnadiene-11$\beta$,16$\alpha$,17$\alpha$,21-tetrol-3,20-dione-16$\alpha$,21-diacetate. |
| 2-formyl-6$\alpha$-chloro-$\Delta^{1,4}$-pregnadiene-11$\beta$,17$\alpha$,21-triol-3,20-dione. | 2-formyl-6$\alpha$-chloro-$\Delta^{1,4}$-pregnadiene-11$\beta$,17$\alpha$,21-triol-3,20-dione-21-acetate. |
| 2-formyl-$\Delta^{1,4}$-pregnadiene-11$\beta$,17$\alpha$,21-triol-3,20-dione. | 2-formyl-$\Delta^{1,4}$-pregnadiene-11$\beta$,17$\alpha$,21-triol-3,20-dione-21-acetate. |

*Example VI*

1 g. of 2-formyl-6$\alpha$,16$\beta$-dimethyl-$\Delta^{1,4}$-pregnadiene-11$\beta$,17$\alpha$,21-triol-3,20-dione was dissolved with slow heating in 12.5 cc. of dimethylformamide, the mixture was cooled, 0.42 g. of mesyl chloride and 0.5 cc. of pyridine were added and the solution was kept at 80° C. for half an hour. The reaction mixture was cooled, water was added and the product was extracted with ethyl acetate. The extract was washed with water, dried over anhydrous sodium sulfate and the solvent was evaporated. Recrystallization of the residue from acetone-hexane furnished 2 - formyl - 6$\alpha$,16$\beta$ - dimethyl - $\Delta^{1,4,9(11)}$ - pregnatrien-17$\alpha$,21-diol-3,20-dione-21-acetate.

When applying the above procedure to the starting compounds listed below, there were obtained the products hereinafter disclosed:

| Starting compounds | Products |
|---|---|
| 2-formyl-16α-methyl-6α-fluoro-$\Delta^{1,4}$-pregnadiene-11β,17α,21-triol-3,20-dione-21-acetate. | 2-formyl-16α-methyl-6α-fluoro-$\Delta^{1,4,9(11)}$-pregnatriene-17α,21-diol-3,20-dione-21-acetate. |
| 2-formyl-16α-methyl-6α-chloro-$\Delta^{1,4}$-pregnadiene-11β,17α,21-triol-3,20-dione-21-acetate. | 2-formyl-16α-methyl-6α-chloro-$\Delta^{1,4,9(11)}$-pregnatriene-17α,21-diol-3,20-dione-21-acetate. |
| 2-formyl-16β-methyl-6α-fluoro-$\Delta^{1,4}$-pregnadiene-11β,17α,triol-3,20-dione-21-acetate. | 2-formyl-16β,methyl-6α-fluoro-$\Delta^{1,4,9(11)}$-pregnatriene-17α,21-diol-3,20-dione-21-acetate. |
| 2-formyl-6α-fluoro-$\Delta^{1,4}$-pregnadiene-11β-16α,17α,21-tetrol-3,20-dione-16α,21-diacetate. | 2-formyl-6α-fluoro-$\Delta^{1,4,9(11)}$-pregnatriene-16α,17α,21-triol-3,20-dione-16α,21-diacetate. |
| 2-formyl-6α-chloro-$\Delta^{1,4}$-pregnadiene-11β,16α,17α,21-tetrol-3,20-dione-16α,21-diacetate. | 2-formyl-6α-chloro-$\Delta^{1,4,9(11)}$-pregnatriene-16α,17α,21-triol-3,20-dione-16α,21-diacetate. |
| 2-formyl-6α-chloro-$\Delta^{1,4}$-pregnadien-11β,17α,21-triol-3,20-dione-21-acetate. | 2-formyl-6α-chloro-$\Delta^{1,4,9(11)}$-pregnatriene-17α,21-diol-3,20-dione-21-acetate. |
| 2-formyl-$\Delta^{1,4}$-pregnadiene-11β,17α,21-triol-3,20-dione-21-acetate. | 2-formyl-$\Delta^{1,4,9(11)}$-pregnatriene-17α,21-diol-3,20-dione-21-acetate. |

Example VII 2.8 g. of N-bromoacetamide were added to a mixture of 5 g. of 2-formyl-6α,16β-dimethyl-$\Delta^{1,4,9(11)}$-pregnatriene-17α,21-diol-3,20-dione-21-acetate (obtained according to Example VI), 50 cc. of pure dioxane and 0.8 cc. of 0.4 N perchloric acid while stirring in the dark and at room temperature during 1 hour. The reaction mixture was stirred for 1 hour further, a solution of 10% sodium sulfite was then added until the potassium starch indicator paper no longer turned blue, ice was added, the mixture was extracted with chloroform and the extract was washed consecutively with water, 5% sodium bicarbonate solution and water, and the solvent was removed by distillation under vacuo. By trituration of the residue with acetone, there was obtained the corresponding 9α-bromo-11β-hydroxy derivative of the starting compound.

A mixture of 2 g. of anhydrous potassium acetate and 20 cc. of acetone was heated almost to boiling and then a solution of 1.7 g. of the bromohydrin in 20 cc. of acetone was added slowly while stirring; the mixture was then refluxed for 10 hours, cooled and almost all of the acetone was distilled off; iced-water was then added, the precipitate was filtered, washed with water and dried. Upon recrystallization from methylene chloride-hexane, there was obtained 2 - formyl - 6α,16β - dimethyl - 9β,11β - oxido-$\Delta^{1,4}$-pregnadiene-17α,21-diol-3,20-dione-21-acetate.

When applying the above technique to the starting compounds listed below, there were obtained the products hereinafter disclosed:

| Starting compounds | Products |
|---|---|
| 2-formyl-16α-methyl-6α-fluoro-$\Delta^{1,4,9(11)}$-pregnatriene-17α,21-diol-3, 20-dione-21-acetate. | 2-formyl-16α-methyl-6α-fluoro-9β, 11β-oxido-$\Delta^{1,4}$-pregnadiene-17α, 21-diol-3, 20-dione-21-acetate. |
| 2-formyl-16α-methyl-6α-chloro-$\Delta^{1,4,9(11)}$-pregnatriene-17α, 21-diol-3, 20-dione-21-acetate. | 2-formyl-16α-methyl-6α-chloro-9β, 11β-oxido-$\Delta^{1,4}$-pregnadiene-17α, 21-diol-3, 20-dione-21-acetate. |
| 2-formyl-16β-methyl-6α-fluoro-$\Delta^{1,4,9(11)}$-pregnatriene-17α, 21-diol-3, 20-dione-21-acetate. | 2-formyl-16β-methyl-6α-fluoro-9β, 11β-oxido-$\Delta^{1,4}$-pregnadiene-17α, 21-diol-3, 20-dione-21-acetate. |
| 2-formyl-6α-fluoro-$\Delta^{1,4,9(11)}$-pregnatriene-16α,17α,21-triol-3,20-dione-16α,21-diacetate. | 2-formyl-6α-fluoro-9β,11β-oxido-$\Delta^{1,4}$-prgenadiene-16α,17α,21-triol-3,20-dione-16,21-diacetate. |
| 2-formyl-6α-chloro-$\Delta^{1,4,9(11)}$-pregnatriene-16α,17α,21-triol-3,20-dione-16α,21-diacetate. | 2-formyl-6α-chloro-9β,11β-oxido-$\Delta^{1,4}$-pregnadiene-16α,17α,21-triol-3,20-dione-16,21-diacetate. |
| 2-formyl-6α-chloro-$\Delta^{1,4,9(11)}$-pregnatriene-17α,21-diol-3,20-dione-21-acetate. | 2-formyl-6α-chloro-9β,11β-oxido-$\Delta^{1,4}$-pregnadiene-17α,21-diol-3,20-dione-21-acetate. |
| 2-formyl-$\Delta^{1,4,9(11)}$-pregnatriene-17α,21-diol-3,20-dione-21-acetate. | 2-formyl-9β,11β-oxido-$\Delta^{1,4}$-pregnadiene-17α,21-diol-3,20-dione-21-acetate. |

Example VIII

In a polyethylene flask, adapted with magnetic stirrer, there was dissolved 1.8 g. of 2-formyl-6α,16β-dimethyl-9β,11β - oxido - $\Delta^{1,4}$ - pregnadiene - 17α,21 - diol - 3,20-dione-21-acetate in 30 cc. of methylene chloride, the solution was cooled to 0° C. and a solution of 2.11 g. of anhydrous hydrogen fluoride in 3.7 cc. of tetrahydrofuran cooled in a Dry-Ice acetone bath (−70° C.) was added over a period of 20 minutes with constant stirring. The mixture was stirred at a temperature lower than 10° C. for 6 additional hours, then neutralized by cautiously adding a 5% aqueous sodium bicarbonate solution and transferred to a separatory funnel. The organic layer was washed with water, dried over anhydrous sodium sulfate and concentrated until formation of an abundant precipitate. The mixture was cooled, the precipitate filtered and redissolved in hot ethyl acetate, the insoluble material was filtered off and the filtrate cooled whereby 2-formyl-6α,16β - dimethyl - 9α - fluoro - $\Delta^{1,4}$ - pregnadiene - 11β, 17α,21-triol-3,20-dione-21-acetate crystallized.

Following the above described procedure, there were treated the hereinafter indicated starting compounds, furnishing the corresponding products disclosed below:

| Starting compounds | Products |
|---|---|
| 2-formyl-16α-methyl-6α-fluoro-9β, 11β-oxido-$\Delta^{1,4}$-pregnadiene-17α, 21-diol-3,20-dione-21-acetate. | 2-formyl-16α-methyl-6α,9α-difluoro-$\Delta^{1,4}$-pregnadiene-11β,17α,21-triol-3,20-dione-21-acetate. |
| 2-formyl-16α-methyl-6α-chloro-9β, 11β-oxido-$\Delta^{1,4}$-pregnadiene-17α, 21-diol-3,20-dione-21-acetate. | 2-formyl-16α-methyl-6α-chloro-9α-fluoro-$\Delta^{1,4}$-pregnadiene-11β,17α, 21-triol-3,20-dione-21-acetate. |
| 2-formyl-16β-methyl-6α-fluoro-9β, 11β-oxido-$\Delta^{1,4}$-pregnadiene-17α, 21-diol-3,20-dione-21-acetate. | 2-formyl-16β-methyl-6α,9α-difluoro-$\Delta^{1,4}$-pregnadiene-11β,17α,21-triol-3,20-dione-21-acetate. |
| 2-formyl-6α-fluoro-9β,11β-oxido-$\Delta^{1,4}$-pregnadine-11β,16α,17α,21-triol-3,20-dione-16,21-diacetate. | 2-formyl-6α,9α-difluoro-$\Delta^{1,4}$-pregnadiene-11β,16α,17α,21-tetrol-3,20-dione-16,21-diacetate. |
| 2-formyl-6α-chloro-9β,11β-oxido-$\Delta^{1,4}$-pregnadiene-16α,17α,21-triol-3,20-dione-16,21-diacetate. | 2-formyl-6α-chloro-9α-fluoro-$\Delta^{1,4}$-pregnadiene-11β,16α,17α,21-tetrol-3,20-dione-16,21-diacetate. |
| 2-formyl-6α-chloro-9β,11β-oxido-$\Delta^{1,4}$-pregnadiene-17α,21-diol-3,20-dione-21-acetate. | 2-formyl-6α-chloro-9α-fluoro-$\Delta^{1,4}$-pregnadiene-11β,17α,21-triol-3, 20-dione-21-acetate. |
| 2-formyl-9β,11β-oxido-$\Delta^{1,4}$-pregnadiene-17α,21-diol-3,20-dione-21-acetate. | 2-formyl-9α-fluoro-$\Delta^{1,4}$-pregnadiene-11β,17α,21-triol-3,20-dione-21-acetate. |

Example IX

To a solution of 4 g. of 2-formyl-6α,16β-dimethyl-9β,11β - oxido - $\Delta^{1,4}$ - pregnadiene - 17α,21 - diol - 3,20-dione-21-acetate (obtained according to Example VII) in 40 cc. of anhydrous chloroform was added, over a period of 35 minutes, 30 cc. of a 0.45 N solution of dry hydrogen chloride in chloroform, under continuous stirring and maintaining the temperature around 0° C. The mixture was then stirred at 0° C. for 1 hour further, diluted with water and the chloroform layer was separated, washed with aqueous sodium bicarbonate solution and then with water, dried over anhydrous sodium sulfate and evaporated under reduced pressure. Crystallization of the residue from acetone-hexane gave 2-formyl-6α,16β-dimethyl - 9α - chloro - $\Delta^{1,4}$ - pregnadiene - 11β,17α,21-triol-3,20-dione-21-acetate.

Upon treatment by the same procedure of the starting compounds listed below, there were obtained the corresponding products hereinafter disclosed:

| Starting compounds | Products |
|---|---|
| 2-formyl-16α-methyl-6α-fluoro-9β,-11β-oxido-$\Delta^{1,4}$-pregnadiene-17α, 21-diol-3,20-dione-21-acetate. | 2-formyl-16α-methyl-6α-fluoro-9α-chloro-$\Delta^{1,4}$-pregnadiene-11β,17α,-21-triol-3,20-dione-21-acetate. |
| 2-formyl-16α-methyl-6α-chloro-9β,-11β-oxido-$\Delta^{1,4}$-pregnadiene-17α,21-diol-3,20-dione-21-acetate. | 2-formyl-16α-methyl-6α,9α-dichloro-$\Delta^{1,4}$-pregnadiene-11β,17α,-21-triol-3,20-dione-21-acetate. |
| 2-formyl-16β-methyl-6α-fluoro-9β,-11β-oxido-$\Delta^{1,4}$-pregnadiene-17α,-21-diol-3,20-dione-21-acetate. | 2-formyl-16β-methyl-6α-fluoro-9α-chloro-$\Delta^{1,4}$-pregnadiene-11β,17α,-21-triol-3,20-dione-21-acetate. |
| 2-formyl-6α-fluoro-9β,11β-oxiodo-$\Delta^{1,4}$-pregnadiene-16α,17α,21-triol-3,20-dione-16,21-diacetate. | 2-formyl-6α-fluoro-9α-chloro-$\Delta^{1,4}$-pregnadiene-11β,16α,17α,21-tetrol-3,20-dione-16,21-diacetate. |
| 2-formyl-6α-chloro-9β,11β-oxido-$\Delta^{1,4}$-pregnadiene-16α,17α,21-triol-3,20-dione-16,21-diacetate. | 2-formyl-6α,9α-dichloro-$\Delta^{1,4}$-pregnadiene-11β,16α,17α,21-tetrol-3,20-dione-16,21-diacetate. |
| 2-formyl-6α-chloro-9β,11β-oxido-$\Delta^{1,4}$-pregnadiene-17α,21-diol-3,20-dione-21-acetate. | 2-formyl-6α,9α-dichloro-$\Delta^{1,4}$-pregnadiene-11β,17α,21-triol-3,20-dione-21-acetate. |
| 2-formyl-9β,11β-oxido-$\Delta^{1,4}$-pregnadiene-17α,21-diol-3,20-dione-21-acetate. | 2-formyl-9α-chloro-$\Delta^{1,4}$-pregnadiene-11β,17α,21-triol-3,20-dione-21-acetate. |

Example X

A solution of 3 g. of 2-formyl-6α,16β-dimethyl-Δ[1,4]-pregnadiene-11β,17α,21-triol-3,20-dione-21-acetate (obtained according to Example V) in 60 cc. of pyridine was added to a mixture of 3 g. of chromic trioxide in 60 cc. of pyridine. The reaction mixture was kept at room temperature overnight. It was then diluted with ethyl acetate, filtered through celite and the filtrate washed well with water, dried and evaporated to dryness. Crystallization from acetone-hexane afforded 2-formyl-6α,16β-dimethyl-Δ[1,4]-pregnadiene-17α,21-diol-3,11,20-trione-21-acetate.

When applying the above described procedure to the starting compounds listed below, there were obtained the corresponding products hereinafter set forth:

| Starting compounds | Products |
|---|---|
| 2-formyl-16α-methyl-6α-fluoro-Δ[1,4]-pregnadiene-11β,17α,21-triol-3,20-dione-21-acetate. | 2-formyl-16α-methyl-6α-fluoro-Δ[1,4]-pregnadiene-17α,21-diol-3,11,20-trione-21-acetate. |
| 2-formyl-16α-methyl-6α-chloro-Δ[1,4]-pregnadiene-11β,17α,21-triol-3,20-dione-21-acetate. | 2-formyl-16α-methyl-6α-chloro-Δ[1,4]-pregnadiene-17α,21-diol-3,11,20-trione-21-acetate. |
| 2-formyl-16β-methyl-6α-fluoro-Δ[1,4]-pregnadiene-11β,17α,21-triol-3,20-dione-21-acetate. | 2-formyl-16β-methyl-6α-fluoro-Δ[1,4]-pregnadiene-17α,21-diol-3,11,20-trione-21-acetate. |
| 2-formyl-6α-fluoro-Δ[1,4]-pregnadiene-11β,16α,17α,21-tetrol-3,20-dione-16,21-diacetate. | 2-formyl-6α-fluoro-Δ[1,4]-pregnadiene-16α,17α,21-triol-3,11,20-trione-16,21-diacetate. |
| 2-formyl-6α-chloro-Δ[1,4]-pregnadiene-11β,16α,17α,21-tetrol-3,20-dione-16α,21-diacetate. | 2-formyl-6α-chloro-Δ[1,4]-pregnadiene-16α,17α,21-triol-3,11,20-trione-16,21-diacetate. |
| 2-formyl-6α-chloro-Δ[1,4]-pregnadiene-11β,17α,21-triol-3,20-dione-21-acetate. | 2-formyl-6α-chloro-Δ[1,4]-pregnadiene-17α,21-diol-3,11,20-trione-21-acetate. |
| 2-formyl-Δ[1,4]-pregnadiene-11β,17α,21-triol-3,20-dione-21-acetate. | 2-formyl-Δ[1,4]-pregnadiene-17α,21-diol-3,11,20-trione-21-acetate. |
| 2-formyl-16α-methyl-6α,9α-difluoro-Δ[1,4]-pregnadiene-11β,17α,21-triol-3,20-dione-21-acetate. | 2-formyl-16α-methyl-6α,9α-difluoro-Δ[1,4]-pregnadiene-17α,21-diol-3,11,20-trione-21-acetate. |
| 2-formyl-16α-methyl-6α-chloro-9α-fluoro-Δ[1,4]-pregnadiene-11β,17α,21-triol-3,20-dione-21-acetate. | 2-formyl-16α-methyl-6α-chloro-9α-fluoro-Δ[1,4]-pregnadiene-17α,21-diol-3,11,20-trione-21-acetate. |
| 2-formyl-16β-methyl-6α,9α-difluoro-Δ[1,4]-pregnadiene-11β,17α,21-triol-3,20-dione-21-acetate. | 2-formyl-16β-methyl-6α,9α-difluoro-Δ[1,4]-pregnadiene-17α,21-diol-3,11,20-trione-21-acetate. |
| 2-formyl-6α,9α-difluoro-Δ[1,4]-pregnadiene-11β,16α,17α,21-tetrol-3,20-dione-16,21-diacetate. | 2-formyl-6α,9α-difluoro-Δ[1,4]-pregnadiene-16α,17α,21-triol-3,11,20-trione-16,21-diacetate. |
| 2-formyl-6α-chloro-9α-fluoro-Δ[1,4]-pregnadiene-11β,16α,17α,21-tetrol-3,20-dione-16,21-diacetate. | 2-formyl-6α-chloro-9α-fluoro-Δ[1,4]-pregnadiene-16α,17α,21-triol-3,11,20-trione-16,21-diacetate. |
| 2-formyl-6α-chloro-9α-fluoro-Δ[1,4]-pregnadiene-11β,17α,21-triol-3,20-dione-21-acetate. | 2-formyl-6α-chloro-9α-fluoro-Δ[1,4]-pregnadiene-17α,21-diol-3,11,20-trione-21-acetate. |
| 2-formyl-9α-fluoro-Δ[1,4]-pregnadiene-11β,17α,21-triol-3,20-dione-21-acetate. | 2-formyl-9α-fluoro-Δ[1,4]-pregnadiene-17α,21-diol-3,11,20-trione-21-acetate. |
| 2-formyl-16α-methyl-6α-fluoro-9α-chloro-Δ[1,4]-pregnadiene-11β,17α,21-triol-3,20-dione-21-acetate. | 2-formyl-16α-methyl-6α-fluoro-9α-chloro-Δ[1,4]-pregnadiene-17α,21-diol-3,11,20-trione-21-acetate. |
| 2-formyl-16α-methyl-6α,9α-dichloro-Δ[1,4]-pregnadiene-11β,17α,21-triol-3,20-dione-21-acetate. | 2-formyl-16α-methyl-6α,9α-dichloro-Δ[1,4]-pregnadiene-17α,21-diol-3,11,20-trione-21-acetate. |
| 2-formyl-16β-methyl-6α-fluoro-9α-chloro-Δ[1,4]-pregnadiene-11β,17α,21-triol-3,20-dione-21-acetate. | 2-formyl-16β-methyl-6α-fluoro-9α-chloro-Δ[1,4]-pregnadiene-17α,21-diol-3,11,20-trione-21-acetate. |
| 2-formyl-6α-fluoro-9α-chloro-Δ[1,4]-pregnadiene-11β,16α,17α,21-tetrol-3,20-dione-16,21-diacetate. | 2-formyl-6α-fluoro-9α-chloro-Δ[1,4]-pregnadiene-16α,17α,21-triol-3,11,20-trione-16,21-diacetate. |
| 2-formyl-6α,9α-dichloro-Δ[1,4]-pregnadiene-11β,16α,17α,21-tetrol-3,20-dione-16,21-diacetate. | 2-formyl-6α,9α-dichloro-Δ[1,4]-pregnadiene-16α,17α,21-triol-3,11,20-trione-16,21-diacetate. |
| 2-formyl-6α,9α-dichloro-Δ[1,4]-pregnadiene-11β,17α,21-triol-3,20-dione-21-acetate. | 2-formyl-6α,9α-dichloro-Δ[1,4]-pregnadiene-17α,21-diol-3,11,20-trione-21-acetate. |
| 2-formyl-9α-chloro-Δ[1,3]-pregnadiene-11β,17α,21-triol-3,20-dione-21-acetate. | 2-formyl-9α-chloro-Δ[1,4]-pregnadiene-17α,21-diol-3,11-20-trione-21-acetate. |
| 2-formyl-6α,16β-dimethyl-9α-fluoro-Δ[1,4]-pregnadiene-11β,17α,21-triol-3,20-dione-21-acetate. | 2-formyl-6α,16β-dimethyl-9α-fluoro-Δ[1,4]-pregnadiene-17α,21-diol-3,11,20-trione-21-acetate. |
| 2-formyl-6α,16β-dimethyl-9α-chloro-Δ[1,4]-pregnadiene-11β,17α,21-triol-3,20-dione-21-acetate. | 2-formyl-6α,16β-dimethyl-9α-chloro-Δ[1,4]-pregnadiene-17α,21-diol-3,11-20,trione-21-acetate. |

Example XI 2 g. of 2-formyl-6α,16β-dimethyl-Δ[1,4]-pregnadiene-17α,21-diol-3,11,20-trione-21-acetate was dissolved in 50 cc. of methanol and treated with 5 cc. of a 4% aqueous solution of potassium hydroxide; the reaction mixture was stirred for 1 hour under an atmosphere of nitrogen at 0° C.; the mixture was neutralized with acetic acid and the methanol distilled under reduced pressure. The residue was triturated with water and the solid collected, washed with water, dried and recrystallized from ethyl acetate-methanol, thus producing 2-formyl-6α,16β-dimethyl-Δ[1,4]-pregnadiene-17α,21-diol-3,11,20-trione.

The starting compounds listed below were treated in accordance with the foregoing procedure yielding the corresponding hereinafter disclosed products:

| Starting compounds | Products |
|---|---|
| 2-formyl-16α-methyl-6α-fluoro-Δ[1,4]-pregnadiene-17α,21-diol-3,11,20-trione-21-acetate. | 2-formyl-16α-methyl-6α-fluoro-Δ[1,4]-pregnadiene-17α,21-diol-3,11,20-trione. |
| 2-formyl-16α-methyl-6α-chloro-Δ[1,4]-pregnadiene-17α,21-diol-3,11,20-trione-21-acetate. | 2-formyl-16α-methyl-6α-chloro-Δ[1,4]-pregnadiene-17α,21-diol-3,11,20-trione. |
| 2-formyl-16β-methyl-6α-fluoro-Δ[1,4]-pregnadiene-17α,21-diol-3,11,20-trione-21-acetate. | 2-formyl-16β-methyl-6α-fluoro-Δ[1,4]-pregnadiene-17α,21-diol-3,11,20-trione. |
| 2-formyl-6α-fluoro-Δ[1,4]-pregnadiene-16α,17α,21-triol-3,11,20-trione-16,21-diacetate. | 2-formyl-6α-fluoro-Δ[1,4]-pregnadiene-16α,17α,21-triol-3,11,20-trione. |
| 2-formyl-6α-chloro-Δ[1,4]-pregnadiene-16α,17α,21-triol-3,11,20-trione-16,21-diacetate. | 2-formyl-6α-chloro-Δ[1,4]-pregnadiene-16α,17α,21-triol-3,11,20-trione. |
| 2-formyl-6α-chloro-Δ[1,4]-pregnadiene-17α,21-diol-3,11,20-trione-21-acetate. | 2-formyl-6α-chloro-Δ[1,4]-pregnadiene-17α,21-diol-3,11,20-trione. |
| 2-formyl-Δ[1,4]-pregnadiene-17α,21-diol-3,11,20-trione-21-acetate. | 2-formyl-Δ[1,4]-pregnadiene-17α,1-diol-3,11,20-trione. |
| 2-formyl-16α-methyl-6α,9α-difluoro-Δ[1,4]-pregnadiene-17α,21-diol-3,11,20-trione-21-acetate. | 2-formyl-16α-methyl-6α,9α-difluoro-Δ[1,4]-pregnadiene-17α,21-diol-3,11,20-trione. |
| 2-formyl-16α-methyl-6α-chloro-9α-fluoro-Δ[1,4]-pregnadiene-17α,21-diol-3,11,20-trione-21-acetate. | 2-formyl-16α-methyl-6α-chloro-9α-fluoro-Δ[1,4]-pregnadiene-17α,21-diol-3,11,20-trione. |
| 2-formyl-16β-methyl-6α,9α-difluoro-Δ[1,4]-pregnadiene-17α,1-diol-3,11,20-trione-21-acetate. | 2-formyl-16β-methyl-6α,9α-difluoro-Δ[1,4]-pregnadiene-17α,1-diol-3,11,20-trione. |
| 2-formyl-6α,9α-difluoro-Δ[1,4]-pregnadiene-16α,17α,21-triol-3,11,20-trione-16,21-diacetate. | 2-formyl-6α,9α-difluoro-Δ[1,4]-pregnadiene-16α,17α,21-triol-3,11,20-trione. |
| 2-formyl-6α-chloro-9α-fluoro-Δ[1,4]-pregnadiene-16α,17α,21-triol-3,11,20-trione-16,21-diacetate. | 2-formyl-6α-chloro-9α-fluoro-Δ[1,4]-pregnadiene-16α,17α,21-triol-3,11,20-trione. |
| 2-formyl-6α-chloro-9α-fluoro-Δ[1,4]-pregnadiene-17α,21-diol-3,11,20-trione-21-acetate. | 2-formyl-6α-chloro-9α-fluoro-Δ[1,4]-pregnadiene-17α,21-diol-3,11,20-trione. |
| 2-formyl-9α-fluoro-Δ[1,4]-pregnadiene-17α,21-diol-3,11,20-trione-21-acetate. | 2-formyl-9α-fluoro-Δ[1,4]-pregnadiene-17α,21-diol-3,11,20-trione. |
| 2-formyl-16α-methyl-6α-fluoro-9α-chloro-Δ[1,4]-pregnadiene-17α,21-diol-3,11,20-trione-21-acetate. | 2-formyl-16α-methyl-6α-fluoro-9α-chloro-Δ[1,4]-pregnadiene-17α,21-diol-3,11,20-trione. |
| 2-formyl-16α-methyl-6α,9α-dichloro-Δ[1,4]-pregnadiene-17α,21-diol-3,11,20-trione-21-acetate. | 2-formyl-16α-methyl-6α,9α-dichloro-Δ[1,4]-pregnadiene-17α,21-diol-3,11,20-trione. |
| 2-formyl-16β-methyl-6α-fluoro-9α-chloro-Δ[1,4]-pregnadiene-17α,21-diol-3,11,20-trione-21-acetate. | 2-formyl-16β-methyl-6α-fluoro-9α-chloro-Δ[1,4]-pregnadiene-17α,21-diol-3,11,20-trione. |
| 2-formyl-6α-fluoro-9α-chloro-Δ[1,4]-pregnadiene-16α,17α,21-triol-3,11,20-trione-16,21-diacetate. | 2-formyl-6α-fluoro-9α-chloro-Δ[1,4]-pregnadiene-16α,17α,21-triol-3,11,20-trione. |
| 2-formyl-6α,9α-dichloro-Δ[1,4]-pregnadiene-16α,17α,21-triol-3,11,20-trione-16,21-diacetate. | 2-formyl-6α,9α-dichloro-Δ[1,4]-pregnadiene-16α,17α,21-triol-3,11,20-trione. |
| 2-formyl-6α,9α-dichloro-Δ[1,4]-pregnadiene-17α,21-diol-3,11,20-trione-21-acetate. | 2-formyl-6α,9α-dichloro-Δ[1,4]-pregnadiene-17α,21-diol-3,11,20-trione. |
| 2-formyl-9α-chloro-Δ[1,4]-pregnadiene-17α,21-diol-3,11,20-trione-acetate. | 2-formyl-9α-chloro-Δ[1,4]-pregnadiene-17α,21-diol-3,11,20-trione. |
| 2-formyl-6α,16β-dimethyl-9α-fluoro-Δ[1,4]-pregnadiene-17α,21-diol-3,11,20-trione-21-acetate. | 2-formyl-6α,16β-dimethyl-9α-fluoro-Δ[1,4]-pregnadiene-17α,21-diol-3,11,20-trione. |
| 2-formyl-6α,16β-dimethyl-9α-chloro-Δ[1,4]-pregnadiene-17α,21-diol-3,11,20-trione-21-acetate. | 2-formyl-6α,16β-dimethyl-9α-chloro-Δ[1,4]-pregnadiene-17α,21-diol-3,11-20-trione. |
| 2-formyl-16α-methyl-6α-fluoro-9α-chloro-Δ[1,4]-pregnadiene-11β,17α,21-triol-3,20-dione-21-acetate. | 2-formyl-16α-methyl-6α-fluoro-9α-chloro-Δ[1,4]-pregnadiene-11β,17α,21-triol-3,20-dione. |
| 2-formyl-16α-methyl-6α,9α-dichloro-Δ[1,4]-pregnadiene-11β,17α,21-triol-3,20-dione-21-acetate. | 2-formyl-16α-methyl-6α,9α-dichloro-Δ[1,4]-pregnadiene-11β,17α,21-triol-3,20-dione. |
| 2-formyl-16β-methyl-6α-fluoro-9α-chloro-Δ[1,4]-pregnadiene-11β,17α,21-triol-3,20-dione-21-acetate. | 2-formyl-16β-methyl-6α-fluoro-9α-chloro-Δ[1,4]-pregnadiene-11β,17α,21-triol-3,20-dione. |
| 2-formyl-6α-fluoro-9α-chloro-Δ[1,4]-pregnadiene-11β,16α,17α,21-tetrol-3,20-dione-16,21-diacetate. | 2-formyl-6α-fluoro-9α-chloro-Δ[1,4]-pregnadiene-11β,16α,17α,21-tetrol-3,20-dione. |
| 2-formyl-6α,9α-dichloro-Δ[1,4]-pregnadiene-11β,16α,17α,21-tetrol-3,20-dione-16,21-diacetate. | 2-formyl-6α,9α-dichloro-Δ[1,4]-pregnadiene-11β,16α,17α,21-tetrol-3,20-dione. |
| 2-formyl-6α,9α-dichloro-Δ[1,4]-pregnadiene-11β,17α,21-triol-3,20-dione-21-acetate. | 2-formyl-6α,9α-dichloro-Δ[1,4]-pregnadiene-11β,17α,21-triol-3,20-dione. |
| 2-formyl-9α-chloro-Δ[1,4]-pregnadiene-11β,17α,21-triol-3,20-dione-21-acetate. | 2-formyl-9α-chloro-Δ[1,4]-pregnadiene-11β,17α,21-triol-3,20-dione. |
| 2-formyl-16α-methyl-6α,9α-difluoro-Δ[1,4]-pregnadiene-11β,17α,21-triol-3,20-dione-21-acetate. | 2-formyl-16α-methyl-6α,9α-difluoro-Δ[1,4]-pregnadiene-11β,17α,21-triol-3,20-dione. |
| 2-formyl-16α-methyl-6α-chloro-9α-fluoro-Δ[1,4]-pregnadiene-11β,17α,21-triol-3,20-dione-21-acetate. | 2-formyl-16α-methyl-6α-chloro-9α-fluoro-Δ[1,4]-pregnadiene-11β,17α,21-triol-3,20-dione. |
| 2-formyl-16β-methyl-6α,9α-difluoro-Δ[1,4]-pregnadiene-11β,17α,21-triol-3,20-dione-21-acetate. | 2-formyl-16β-methyl-6α,9α-difluoro-Δ[1,4]-pregnadiene-11β,17α,21-triol-3,20-dione. |

| Starting compounds | Products |
|---|---|
| 2-formyl-6α,9α-difluoro-Δ¹,⁴-pregnadiene-11β,16α,17α,21-tetrol-3,20-dione-16,21-diacetate. | 2-formyl-6α,9α-difluoro-Δ¹,⁴-pregnadiene-11β,16α,17α,21-tetrol-3,20-dione. |
| 2-formyl-6α-chloro-9α-fluoro-Δ¹,⁴-pregnadiene-11β,16α,17α,21-tetrol-3,20-dione-16,21-diacetate. | 2-formyl-6α-chloro-9α-fluoro-Δ¹,⁴-pregnadiene-11β,16α,17α,21-tetrol-3,20-dione. |
| 2-formyl-6α-chloro-9α-fluoro-Δ¹,⁴-pregnadiene-11β,17α,21-triol-3,20-dione-21-acetate. | 2-formyl-6α-chloro-9α-fluoro-Δ¹,⁴-pregnadiene-11β,17α,21-triol-3,20-dione. |
| 2-formyl-9α-fluoro-Δ¹,⁴-pregnadiene-11β,17α,21-triol-3,20-dione-21-acetate. | 2-formyl-9α-fluoro-Δ¹,⁴-pregnadiene-11β,17α,21-triol-3,20-dione. |
| 2-formyl-6α,16β-dimethyl-9α-fluoro-Δ¹,⁴-pregnadiene-11β,17α,21-triol-3,20-dione-21-acetate. | 2-formyl-6α,16β-dimethyl-9α-fluoro-Δ¹,⁴-pregnadiene-11β,17α,21-triol-3,20-dione. |
| 2-formyl-6α,16β-dimethyl-9α-chloro-Δ¹,⁴-pregnadiene-11β,17α,21-triol-3,20-dione-21-acetate. | 2-formyl-6α,16β-dimethyl-9α-chloro-Δ¹,⁴-pregnadiene-11β,17α,21-triol-3,20-dione. |

Example XII

A mixture of 1 g. of 2-formyl-6α,16β-dimethyl-Δ¹,⁴-pregnadiene-17α,21-diol-3,11,20-trione, 4 cc. of pyridine and 2 cc. of propionic anhydride was kept at room temperature overnight, poured into ice water, and the formed precipitate was filtered, washed with water and dried. Crystallization from acetone-hexane gave 2-formyl-6α,16β-dimethyl-Δ¹,⁴-pregnadiene-17α,21-diol-3,11,20-trione-21-propionate.

When applying the above procedure to the starting compounds listed below, there were obtained the corresponding products disclosed hereinafter:

| Starting compounds | Products |
|---|---|
| 2-formyl-16α-methyl-6α-fluoro-Δ¹,⁴-pregnadiene-17α,21-diol-3,11,20-trione. | 21-propionate of 2-formyl-16α-methyl-6α-fluoro-Δ¹,⁴-pregnadiene-17α,21-diol-3,11,20-trione. |
| 2-formyl-16α-methyl-6α-chloro-Δ¹,⁴-pregnadiene-17α,21-diol-3,11,20-trione. | 21-propionate of 2-formyl-16α-methyl-6α-chloro-Δ¹,⁴-pregnadiene-17α,21-diol-3,11,20-trione. |
| 2-formyl-16β-methyl-6α-fluoro-Δ¹,⁴-pregnadiene-17α,21-diol-3,11,20-trione. | 21-propionate of 2-formyl-16β-methyl-6α-fluoro-Δ¹,⁴-pregnadiene-17α,21-diol-3,11,20-trione. |
| 2-formyl-6α-fluoro-Δ¹,⁴-pregnadiene-16α,17α,21-triol-3,11,20-trione. | 16,21-dipropionate of 2-formyl-6α-fluoro-Δ¹,⁴-pregnadiene-16α,17α,21-triol-3,11,20-trione. |
| 2-formyl-6α-chloro-Δ¹,⁴-pregnadiene-16α,17α,21-triol-3,11,20-trione. | 16,21-dipropionate of 2-formyl-6α-chloro-Δ¹,⁴-pregnadiene-16α,17α,21-triol-3,11,20-trione. |
| 2-formyl-6α-chloro-Δ¹,⁴-pregnadiene-17α,21-diol-3,11,20-trione. | 21-propionate of 2-formyl-6α-chloro-Δ¹,⁴-pregnadiene-17α,21-diol-3,11,20-trione. |
| 2-formyl-Δ¹,⁴-pregnadiene-17α,21-diol-3,11,20-trione. | 21-propionate of 2-formyl-Δ¹,⁴-pregnadiene-17α,21-diol-3,11,20-trione. |
| 2-formyl-16α-methyl-6α,9α-difluoro-Δ¹,⁴-pregnadiene-17α,21-diol-3,11,20-trione. | 21-propionate of 2-formyl-16α-methyl-6α,9α-difluoro-Δ¹,⁴-pregnadiene-17α,21-diol-3,11,20-trione. |
| 2-formyl-16α-methyl-6α-chloro-9α-fluoro-Δ¹,⁴-pregnadiene-17α,21-diol-3,11,20-trione. | 21-propionate of 2-formyl-16α-methyl-6α-chloro-9α-fluoro-Δ¹,⁴-pregnadiene-17α,21-diol-3,11,20-trione. |
| 2-formyl-16β-methyl-6α,9α-difluoro-Δ¹,⁴-pregnadiene-17α,21-diol-3,11,20-trione. | 21-propionate of 2-formyl-16β-methyl-6α,9α-difluoro-Δ¹,⁴-pregnadiene-17α,21-diol-3,11,20-trione. |
| 2-formyl-6α,9α-difluoro-Δ¹,⁴-pregnadiene-16α,17α,21-triol-3,11,20-trione. | 16,21-dipropionate of 2-formyl-6α,9α-difluoro-Δ¹,⁴-pregnadiene-16α,17α,21-triol-3,11,20-trione. |
| 2-formyl-6α-chloro-9α-fluoro-Δ¹,⁴-pregnadiene-16α,17α,21-triol-3,11,20-trione. | 16,21-dipropionate of 2-formyl-6α-chloro-9α-fluoro-Δ¹,⁴-pregnadiene-16α,17α,21-triol-3,11,20-trione. |
| 2-formyl-6α-chloro-9α-fluoro-Δ¹,⁴-pregnadiene-17α,21-diol-3,11,20-trione. | 21-propionate of 2-formyl-6α-chloro-9α-fluoro-Δ¹,⁴-pregnadiene-17α,21-diol-3,11,20-trione. |
| 2-formyl-9α-fluoro-Δ¹,⁴-pregnadiene-17α,21-diol-3,11,20-trione. | 21-propionate of 2-formyl-9α-fluoro-Δ¹,⁴-pregnadiene-17α,21-diol-3,11,20-trione. |
| 2-formyl-16α-methyl-6α-fluoro-9α-chloro-Δ¹,⁴-pregnadiene-11β,17α,21-triol-3,20-dione. | 21-propionate of 2-formyl-16α-methyl-6α-fluoro-9α-chloro-Δ¹,⁴-pregnadiene-11β,17α,21-triol-3,20-dione. |
| 2-formyl-16α-methyl-6α,9α-dichloro-Δ¹,⁴-pregnadiene-11β,17α,21-triol-3,20-dione. | 21-propionate of 2-formyl-16α-methyl-6α,9α-dichloro-Δ¹,⁴-pregnadiene-11β,17α,21-triol-3,20-dione. |
| 2-formyl-16β-methyl-6α-fluoro-9α-chloro-Δ¹,⁴-pregnadiene-11β,17α,21-triol-3,20-dione. | 21-propionate of 2-formyl-16β-methyl-6α-fluoro-9α-chloro-Δ¹,⁴-pregnadiene-11β,17α,21-triol-3,20-dione. |
| 2-formyl-6α-fluoro-9α-chloro-Δ¹,⁴-pregnadiene-11β,16α,17α,21-tetrol-3,20-dione. | 16,21-dipropionate of 2-formyl-6α-fluoro-9α-chloro-Δ¹,⁴-pregnadiene-11β,16α,17α,21-tetrol-3,20-dione. |
| 2-formyl-6α,9α-dichloro-Δ¹,⁴-pregnadiene-11β,16α,17α,21-tetrol-3,20-dione. | 16,21-dipropionate of 2-formyl-6α,9α-dichloro-Δ¹,⁴-pregnadiene-11β,16α,17α,21-tetrol-3,20-dione. |
| 2-formyl-6α,9α-dichloro-Δ¹,⁴-pregnadiene-11β,17α,21-triol-3,20-dione. | 21-propionate of 2-formyl-6α,9α-dichloro-Δ¹,⁴-pregnadiene-11β,17α,21-triol-3,20-dione. |
| 2-formyl-9α-chloro-Δ¹,⁴-pregnadiene-11β,17α,21-triol-3,20-dione. | 21-propionate of 2-formyl-9α-chloro-Δ¹,⁴-pregnadiene-11β,17α,21-triol-3,20-dione. |
| 2-formyl-16α-methyl-6α,9α-difluoro-Δ¹,⁴-pregnadiene-11β,17α,21-triol-3,20-dione. | 21-propionate of 2-formyl-16α-methyl-6α,9α-difluoro-Δ¹,⁴-pregnadiene-11β,17α,21-triol-3,20-dione. |
| 2-formyl-16α-methyl-6α-chloro-9α-fluoro-Δ¹,⁴-pregnadiene-11β,17α,21-triol-3,20-dione. | 21-propionate of 2-formyl-16α-methyl-6α-chloro-9α-fluoro-Δ¹,⁴-pregnadiene-11β,17α,21-triol-3,20-dione. |
| 2-formyl-16β-methyl-6α-fluoro-Δ¹,⁴-pregnadiene-11β,17α,21-triol-3,20-dione. | 21-propionate of 2-formyl-16β-methyl-6α-fluoro-Δ¹,⁴-pregnadiene-11β,17α,21-triol-3,20-dione. |
| 2-formyl-6α,9α-difluoro-Δ¹,⁴-pregnadiene-11β,16α,17α,21-tetrol-3,20-dione. | 16,21-dipropionate of 2-formyl-6α,9α-difluoro-Δ¹,⁴-pregnadiene-11β,16α,17α,21-tetrol-3,20-dione. |
| 2-formyl-6α-chloro-9α-fluoro-Δ¹,⁴-pregnadiene-11β,17α,21-triol-3,20-dione. | 21-propionate of 2-formyl-6α-chloro-9α-fluoro-Δ¹,⁴-pregnadiene-11β,17α,21-triol-3,20-dione. |
| 2-formyl-9α-fluoro-Δ¹,⁴-pregnadiene-11β,17α,21-triol-3,20-dione. | 21-propionate of 2-formyl-9α-fluoro-Δ¹,⁴-pregnadiene-11β,17α,21-triol-3,20-dione. |
| 2-formyl-6α,16β-dimethyl-9α-fluoro-Δ¹,⁴-pregnadiene-11β,17α,21-triol-3,20-dione. | 21-propionate of 2-formyl-6α,16β-dimethyl-9α-fluoro-Δ¹,⁴-pregnadiene-11β,17α,21-triol-3,20-dione. |
| 2-formyl-6α,16β-dimethyl-9α-chloro-Δ¹,⁴-pregnadiene-11β,17α,21-triol-3,20-dione. | 21-propionate of 2-formyl-6α,16β-dimethyl-9α-chloro-Δ¹,⁴-pregnadiene-11β,17α,21-triol-3,20-dione. |
| 2-formyl-16β-dimethyl-Δ¹,⁴-pregnadiene-11β,17α,21-triol-3,20-dione. | 21-propionate of 2-formyl-16β-dimethyl-Δ¹,⁴-pregnadiene-11β,17α,21-triol-3,20-dione. |
| 2-formyl-16α-methyl-6α-fluoro-Δ¹,⁴-pregnadiene-11β,17α,21-triol-3,20-dione. | 21-propionate of 2-formyl-16α-methyl-6α-fluoro-Δ¹,⁴-pregnadiene-11β,17α,21-triol-3,20-dione. |
| 2-formyl-16α-methyl-6α-chloro-Δ¹,⁴-pregnadiene-11β,17α,21-triol-3,20-dione. | 21-propionate of 2-formyl-16α-methyl-6α-chloro-Δ¹,⁴-pregnadiene-11β,17α,21-triol-3,20-dione. |
| 2-formyl-16β-methyl-6α-fluoro-Δ¹,⁴-pregnadiene-11β,17α,21-triol-3,20-dione. | 21-propionate of 2-formyl-16β-methyl-6α-fluoro-Δ¹,⁴-pregnadiene-11β,17α,21-triol-3,20-dione. |
| 2-formyl-6α-fluoro-Δ¹,⁴-pregnadiene-11β,16α,17α,21-tetrol-3,20-dione. | 16,21-dipropionate of 2-formyl-6α-fluoro-Δ¹,⁴-pregnadiene-11β,16α,17α,21-tetrol-3,20-dione. |
| 2-formyl-6α-chloro-Δ¹,⁴-pregnadiene-11β,16α,17α,21-tetrol-3,20-dione. | 16,21-dipropionate of 2-formyl-6α-chloro-Δ¹,⁴-pregnadiene-11β,16α,17α,21-tetrol-3,20-dione. |
| 2-formyl-6α-chloro-Δ¹,⁴-pregnadiene-11β,17α,21-triol-3,20-dione. | 21-propionate of 2-formyl-6α-chloro-Δ¹,⁴-pregnadiene-11β,17α,21-triol-3,20-dione. |
| 2-formyl-Δ¹,⁴-pregnadiene-11β,17α,21-triol-3,20-dione. | 21-propionate of 2-formyl-Δ¹,⁴-pregnadiene-11β,17α,21-triol-3,20-dione. |

Example XIII

Following the procedure described in Example XII except that propionic anhydride was substituted by caproic anhydride, cyclopentylpropionic anhydride and benzoyl chloride, there were correspondingly obtained the respec-

Example XIV

To 120 cc. of acetone containing 1 g. of 2-formyl-6α-fluoro-$\Delta^{1,4}$-pregnadiene - 16α,17α,21 - triol-3,11,20-trione, there were added 30 drops of 78% perchloric acid. After 1 hour at room temperature, 30 drops of pyridine were added and the resulting solution was evaporated to dryness under reduced pressure. 30 cc. of water were added to the residue and it was then extracted several times with 80 cc. of ethyl acetate. The combined extracts were washed to neutrality with water, dried over sodium sulfate and evaporated to dryness under high vacuum. The residue, upon crystallization from methanol, furnished 16α,17α - isopropylidenedioxy - 2 - formyl-6α-fluoro-$\Delta^{1,4}$-pregnadien-21-ol-3,11,20-trione.

When applying the above procedure to the starting compounds listed below, there were obtained the corresponding products hereinafter set forth:

| Starting compounds | Products |
|---|---|
| 2 - formyl - 6α - chloro-$\Delta^{1,4}$ - pregnadiene-16α,17α,21-triol-3,11,20-trione. | 16α,17α - isopropylidenedioxy - 2 - formyl-6α-chloro-$\Delta^{1,4}$-pregnadien-21-ol-3,11,20-trione. |
| 2-formyl-6α,9α-difluoro-$\Delta^{1,4}$-pregnadiene-16α,17α,21-triol-3,11,20-trione. | 16α,17α-isopropylidenedioxy-2-formyl-6α,9α-difluoro-$\Delta^{1,4}$-pregnadien-21-ol-3,11,20-trione. |
| 2-formyl-6α-chloro-9α-fluoro-$\Delta^{1,4}$-pregnadiene-16α,17α,21-triol-3,11,20-trione. | 16α,17α-isopropylidenedioxy-2-formyl-6α-chloro-9α-fluoro-$\Delta^{1,4}$-pregnadien-21-ol-3,11,20-trione. |
| 2-formyl-6α-fluoro-9α-chloro-$\Delta^{1,4}$-pregnadiene-16α,17α,21-triol-3,11,20-trione. | 16α,17α - isopropylidenedioxy - 2 - formyl-6α-fluoro-9α-chloro-$\Delta^{1,4}$-pregnadien-21-ol-3,11,20-trione. |
| 2-formyl-6α,9α-dichloro-$\Delta^{1,4}$-pregnadiene-16α,17α,21-triol-3,11,20-trione. | 16α,17α - isopropylidenedioxy - 2 - formyl-6α,9α-dichloro-$\Delta^{1,4}$-pregnadien-21-ol-3,11,20-trione. |
| 2-formyl-6α-fluoro-9α-chloro-$\Delta^{1,4}$-pregnadiene-11β,16α,17α,21-tetrol-3,20-dione. | 16α,17α - isopropylidenedioxy - 2 - formyl-6α-fluoro-9α-chloro-$\Delta^{1,4}$-pregnadiene-11β,21-diol-3,20-dione. |
| 2-formyl-6α,9α-dichloro-$\Delta^{1,4}$-pregnadiene-11β,16α-17α-21-tetrol-3,20-dione. | 16α,17α - isopropylidenedioxy - 2 - formyl-6α,9α-dichloro-$\Delta^{1,4}$-pregnadiene-11β,21-diol-3,20-dione. |
| 2-formyl-6α,9α-difluoro-$\Delta^{1,4}$-pregnadiene-11β,16α,17α,21-tetrol-3,20-dione. | 16α,17α-isopropylidenedioxy-2-formyl-6α,9α-difluoro-$\Delta^{1,4}$-pregnadiene-11β,21-diol-3,20-dione. |
| 2-formyl-6α-chloro-9α-fluoro-$\Delta^{1,4}$-pregnadiene-11β,16α,17α,21-tetrol-3,20-dione. | 16α,17α-isopropylidenedioxy-2-formyl-6αchloro-9α-fluoro-$\Delta^{1,4}$-pregnadiene-11β,21-diol-3,20-dione. |
| 2 - formyl - 6α - fluoro - $\Delta^{1,4}$ - pregnadiene-11β,16α,17α,21-tetrol-3,20-dione. | 16α,17α-isopropylidenedioxy-2-formyl-6α-fluoro-$\Delta^{1,4}$-pregnadiene-11β,21-diol-3,20-dione. |
| 2 - formyl - 6α - chloro -$\Delta^{1,4}$ - pregnadiene-11β,16α,17α,21-tetrol-3,20-dione. | 16α,17α-isopropylidenedioxy-2-formyl-6α-chloro-$\Delta^{1,4}$-pregnadiene-11β,21-diol-3,20-dione. |

Example XV

Following the procedure described in Example XIV but substituting the acetone by a solution of 10 g. of acetophenone in 100 cc. of dioxane, there was treated 2-formyl-6α-fluoro - $\Delta^{1,4}$ - pregnadiene - 16α,17α,21 - triol-3,11,20-trione yielding 16α,17α-(methyl phenyl methylenedioxy)-2-formyl-6α-fluoro-$\Delta^{1,4}$-pregnadien-21-ol-3,11,20-trione.

By the same method, there were treated the starting compounds hereinafter listed, thus furnishing the corresponding products disclosed below:

| Starting compounds | Products |
|---|---|
| 2 - formyl - 6α - chloro -$\Delta^{1,4}$ - pregnadiene-16α,17α,21-triol-3,11,20-trione. | 16α,17α-(methylphenylmethylenedioxy) - 2 - formyl - 6α - chloro-$\Delta^{1,4}$-pregnadien-21-ol-3,11,20-trione. |
| 2-formyl-6α,9α-difluoro-$\Delta^{1,4}$-pregnadiene-16α,17α,21-triol-3,11,20-trione. | 16α,17α-(methyl phenyl methylenedioxy)-2-formyl-6α,9α-difluoro-$\Delta^{1,4}$-pregnadien-21-ol-3,11,20-trione. |
| 2-formyl-6α-chloro-9α-fluoro-$\Delta^{1,4}$-pregnadiene-16α,17α,21 triol-3,3,11,20-trione. | 16α,17α-methyl phenyl methylenedioxy)-2-formyl-6α-chloro-9α-fluoro-$\Delta^{1,4}$-pregnadien-21-ol-3,11,20-trione. |
| 2-formyl-6α-fluoro-9α-chloro-$\Delta^{1,4}$-pregnadiene-16α,17α-21-triol-3,11,20-trione. | 16α,17α-(methyl phenyl methylenedioxy)-2-formyl-6α-fluoro-9α-chloro-$\Delta^{1,4}$-pregnadiene-21-ol-3,11,20-trione. |
| 2-formyl-6α,9α-dichloro-$\Delta^{1,4}$-pregnadiene-16α,17α,21-triol-3,11,20-trione. | 16α,17α-(methyl phenyl methylenedioxy)-2-formyl-6α,9α-dichloro-$\Delta^{1,4}$-pregnadien-21-ol-3,11,20-trione. |
| 2-formyl-6α-fluoro-9α-chloro-$\Delta^{1,4}$-pregnadiene-11β,16α,17α,21-tetrol-3,20-dione. | 16α,17α-(methyl phenyl methylenedioxy)-2-formyl-6α-fluoro-9α-chloro-$\Delta^{1,4}$-pregnadiene-11β,21-diol-3,20-dione. |
| 2-formyl-6α,9α-dichloro-$\Delta^{1,4}$-pregnadiene-11β,16α,17α,21-tetrol-3,20-dione. | 16α,17α-(methyl phenyl methylenedioxy)-2-formyl-6α, 9α-dichloro-$\Delta^{1,4}$-pregnadiene-11β,21-diol-3,20-dione. |
| 2-formyl-6α,9α-difluoro-$\Delta^{1,4}$-pregnadiene-11β,16α,17α,21-tetrol-3,20-dione. | 16α,17α-(methyl phenyl methylenedioxy)-2-formyl-6α,9α-difluoro-$\Delta^{1,4}$-pregnadiene-11β, 21-diol-3,20-dione. |
| 2-formyl-6α-chloro-9α-fluoro-$\Delta^{1,4}$-pregnadiene-11β,16α,17α,21-tetrol-3,20-dione. | 16α,17α-(methyl phenyl methylenedioxy)-2-formyl-6α-chloro-9α-fluoro-$\Delta^{1,4}$-pregnadiene-11β, 21-diol-3,20-dione. |
| 2-formyl-6α-fluoro-$\Delta^{1,4}$-pregnadiene-11β,16α,17α,21-tetrol-3,20-dione. | 16α,17α-(methyl phenyl methylenedioxy)-2-formyl 6α-fluoro-$\Delta^{1,4}$-pregnadiene-11β,21-diol-3, 20-dione. |
| 2-formyl-6α-chloro-$\Delta^{1,4}$-pregnadiene-11β,16α,17α,21-tetrol-3, 20-dione. | 16α,17α-(methyl phenyl methylenedioxy)-2-formyl 6α-chloro-$\Delta^{1,4}$-pregnadiene-11β,21-diol-3, 20-dione. |

Example XVI

The starting compounds listed below were treated following the procedure described in Example XII affording the corresponding products hereinafter disclosed:

| Starting compounds | Products |
|---|---|
| 16α,17α-isopropylidenedioxy-2-formyl-6α-fluoro-$\Delta^{1,4}$-pregnadiene-21-ol-3,11,20-trione. | 21-propionate of 16α,17α-isopropylidenedioxy-2-formyl-6α-fluoro-$\Delta^{1,4}$-pregnadiene-21-ol-3, 11,20-trione. |
| 16α,17α-isopropylidenedioxy-2-formyl-6α-chloro-$\Delta^{1,4}$-pregnadiene-21-ol-3,11,20-trione. | 21-propionate of 16α,17α-isopropylidenedioxy-2-formyl-6α-chloro-$\Delta^{1,4}$-pregnadien-21-ol-3, 11,20-trione, |
| 16α,17α-isopropylidenedioxy-2-formyl-16α, 9α-difluoro-$\Delta^{2,4}$-pregnadiene-21-ol-3,11,20-trione. | 21-propionate of 16α,17α-isopropylidenedioxy-2-formyl-6α, 9α-difluoro-$\Delta^{1,4}$-pregnadiene-21-ol-3,11,20-trione. |
| 16α,17α-isopropylidenedioxy-2-formyl-6α-chloro-9α-fluoro-$\Delta^{1,4}$-pregnadiene-21-ol-3,11,20-trione. | 21-propionate of 16α,17α-isopropylidenedioxy-2-formyl-6α-chloro-9α-fluoro-$\Delta^{1,4}$-pregnadien-21-ol-3,11,20-trione. |
| 16α,17α-isopropylidenedioxy-2-formyl-6α-fluoro-9α-chloro-$\Delta^{1,4}$-pregnadiene-21-ol-3,11,20-trione. | 21-propionate of 16α,17α-isopropylidenedioxy-2-formyl-6α-fluoro-9α-chloro-$\Delta^{1,4}$-pregnadien-21-ol-3,11,20-trione. |
| 16α,17α-isopropylidenedioxy-2-formyl-6α,9α-dichloro-$\Delta^{1,4}$-pregnadien-21-ol-3,11,20-trione. | 21-propionate of 16α,17α-isopropylidenedioxy-2-formyl-6α,9α-dichloro-$\Delta^{1,4}$-pregnadien-21-ol-3,11,20-trione. |
| 16α,17α-isopropylidenedioxy-2-formyl-6α-fluoro-9α-chloro-$\Delta^{1,4}$-pregnadiene-11β,21-diol-3,20-dione. | 21-propionate of 16α,17α-isopropylidenedioxy-2-formyl-6α-fluoro-9α-chloro-$\Delta^{1,4}$-pregnadiene-11β,21-diol-3,20-dione. |
| 16α,17α-isopropylidenedioxy-2-formyl-6α,9α-dichloro-$\Delta^{1,4}$-pregnadiene-11β,21-diol-3,20-dione. | 21-propionate of 16α,17α-isopropylidenedioxy-2-formyl-6α,9α-dichloro-$\Delta^{1,4}$-pregnadiene-11β,21-diol-3,20-dione. |
| 16α,17α-isopropylidenedioxy-2-formyl-6α,9α-difluoro-$\Delta^{1,4}$-pregnadiene-11β,21-diol-3,20-dione. | 21-propionate of 16α,17α-isopropylidenedioxy-2-formyl-6α,9α-difluoro-$\Delta^{1,4}$-pregnadiene-11β,21-diol-3,20-dione. |
| 16α,17α-isopropylidenedioxy-2-formyl-6α-chloro-9α-fluoro-$\Delta^{1,4}$-pregnadiene-11β,21-diol-3,20-dione. | 21-propionate of 16α,17α-isopropylidenedioxy-2-formyl-6α-chloro-9α-fluoro-$\Delta^{1,4}$-pregnadiene-11β,21-diol-3,20-dione. |
| 16α,17α-isopropylidenedioxy-2-formyl-6α-fluoro-$\Delta^{1,4}$-pregnadiene-11β,21-diol-3,20-dione. | 21-propionate of 16α,17α-isopropylidenedioxy-2-formyl-6α-fluoro-$\Delta^{1,4}$-pregnadiene-11β,21-diol-3,20-dione. |
| 16α,17α-isopropylidenedioxy-2-formyl-6α-chloro-$\Delta^{1,4}$-pregnadiene-11β,21-diol-3,20-dione. | 21-propionate of 16α,17α-isopropylidenedioxy-2-formyl-6α-chloro-$\Delta^{1,4}$-pregnadiene-11β,21-diol-3,20-dione. |
| 16α,17α-(methyl phenyl methylenedioxy)-2-formyl-6α-fluoro-$\Delta^{1,4}$-pregnadien-21-ol-3,11,20-trione. | 21-propionate of 16α,17α-(methyl phenyl methylenedioxy)-2-formyl-6α-fluoro-$\Delta^{1,4}$-pregnadien-21-ol-3,11,20-trione. |
| 16α,17α-(methyl phenyl methylenedioxy)-2-formyl-6α-chloro-$\Delta^{1,4}$-pregnadien-21-ol-3,11,20-trione. | 21-propionate of 16α,17α-(methyl phenyl methylenedioxy)-2-formyl-6α-chloro-$\Delta^{1,4}$-pregnadien-21-ol-3,11,20-trione. |
| 16α,17α-(methyl phenyl methylenedioxy)-2-formyl-6α,9α-difluoro-$\Delta^{1,4}$-pregnadien-21-ol-3,11,20-trione. | 21-propionate of 16α,17α-(methyl phenyl methylenedioxy)-2-formyl-6α,9α-difluoro-$\Delta^{1,4}$-pregnadien-21-ol-3,11,20-trione. |
| 16α,17α-(methyl phenyl methylenedioxy)-2-formyl-6α-chloro-9α-fluoro-$\Delta^{1,4}$-pregnadien-21-ol-3,11,20-trione. | 21-propionate of 16α,17α-(methyl phenyl methylenedioxy)-2-formyl-6α-chloro-9α-fluoro-$\Delta^{1,4}$-pregnadien-21-ol-3,11,20-trione. |
| 16α,17α-(methyl phenyl methylenedioxy)-2-formyl-6α-fluoro-9α-chloro-$\Delta^{1,4}$-pregnadien-21-ol-3,11,20-trione. | 21-propionate of 16α,17α-(methyl phenyl methylenedioxy)-2-formyl-6α-fluoro-9α-chloro-$\Delta^{1,4}$-pregnadien-21-ol-3,11,20-trione. |

| Starting compounds | Products |
|---|---|
| 16α,17α-(methyl phenyl methylenedioxy)-2-formyl-6α,9α-dichloro-Δ¹,⁴-pregnadien-21-ol-3,11,20-trione. | 21-propionate of 16α,17α-(methyl phenyl methylenedioxy)-2-formyl-6α,9α-dichloro-Δ¹,⁴-pregnadien-21-ol-3,11,20-trione. |
| 16α,17α-(methyl phenyl methylenedioxy)-2-formyl-6α-fluoro-9α-chloro-Δ¹,⁴-pregnadiene-11β,21-diol-3,20-dione. | 21-propionate of 16α,17α-(methyl phenyl methylenedioxy)-2-formyl-6α-fluoro-9α-chloro,Δ¹,⁴-pregnadiene-11β,21-diol-3,20-dione. |
| 16α,17α-(methyl phenyl methylenedioxy)-2-formyl-6α,9α-dichloro-Δ¹,⁴-pregnadiene-11β,21-diol-3,20-dione. | 21-propionate of 16α,17α-(methyl phenyl methylenedioxy)-2-formyl-6α,9α-dichloro-Δ¹,⁴-pregnadiene-11β,21-diol-3,20-dione. |
| 16α,17α-(methyl phenyl methylenedioxy)-2-formyl-6α,9α-difluoro-Δ¹,⁴-pregnadiene-11β,21-diol-3,20-dione. | 21-propionate of 16α,17α-(methyl phenyl methylenedioxy)-2-formyl-6α,9α-difluoro-Δ¹,⁴-pregnadiene-11β,21-diol-3,20-dione. |
| 16α,17α-(methyl phenyl methylenedioxy)-2-formyl-6α-chloro-9α-fluoro-Δ¹,⁴-pregnadiene-11β,21-diol-3,20-dione. | 21-propionate of 16α,17α-(methyl phenyl methylenedioxy)-2-formyl-6α-chloro-9α-fluoro-Δ¹,⁴-pregnadiene-11β,21-diol-3,20-dione. |
| 16α,17α-(methyl phenyl methylenedioxy)-2-formyl-6α-fluoro-Δ¹,⁴-pregnadiene-11β,21-diol-3,20-dione. | 21-propionate of 16α,17α-(methyl phenyl methylenedioxy)-2-formyl-6α-fluoro-Δ¹,⁴-pregnadiene-11β,21-diol-3,20-dione. |
| 16α,17α-(methyl phenyl methylenedioxy)-2-formyl-6α-chloro-Δ¹,⁴-pregnadiene,11β,21-diol-3,20-dione. | 21-propionate of 16α,17α-(methyl phenyl methylenedioxy)-2-formyl-6α-chloro-Δ¹,⁴-pregnadiene-11β,21-diol-3,20-dione. |

Example XVII

Following the procedure described in Example XII, except that propionic anhydride was substituted by acetic anhydride and benzoyl chloride, there were treated the starting compounds set forth in Example XVI, thus furnishing the corresponding 21-acetates, 21-caproates, 21-cyclopentylpropionates and 21-benzoates thereof.

We claim:

1. A compound of the following formula:

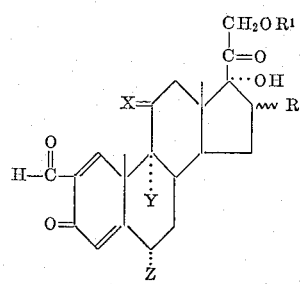

wherein X is selected from the group consisting of β-hydroxy and keto; Y is a member of the group consisting of hydrogen, fluorine and chlorine; Z is selected from the group consisting of hydrogen, fluorine, chlorine and methyl; and R is selected from the group consisting of hydrogen, α-methyl, β-methyl, α-hydroxy and α-hydrocarbon carboxylic acyloxy of less then 12 carbon atoms; and R¹ is selected from the group consisting of hydrogen and a hydrocarbon carboxylic acyl group of less than 12 carbon atoms.

2. 2-formyl-Δ¹,⁴-pregnadiene-11β,17α,21-triol-3,20-dione.

3. 2-formyl-6α,16β-dimethyl-Δ¹,⁴-pregnadiene-11β,17α,21-triol-3,20-dione.

4. 2-formyl-16α-methyl-6α-fluoro-Δ¹,⁴-pregnadiene-11β,17α,21-triol-3,20-dione.

5. 2-formyl-16β-methyl-6α-fluoro-Δ¹,⁴-pregnadiene-11β,17α,21-triol-3,20-dione.

6. 2-formyl-9α-fluoro-Δ¹,⁴-pregnadiene-11β-17α,21-triol-3,20-dione.

7. 2-formyl-6α-9α-difluoro-Δ¹,⁴-pregnadiene-11β,16α,17α,21-tetrol-3,20-dione.

8. 2-formyl-6α-chloro-9α-fluoro-Δ¹,⁴-pregnadiene-11β,17α,21-triol-3,20-dione.

9. 2-formyl-16α-methyl-6α,9α-difluoro-Δ¹,⁴-pregnadiene-11β,17α,21-triol-3,20-dione.

10. 2-formyl-Δ¹,⁴-pregnadiene-17α,21-diol-3,11,20-trione.

11. 2-formyl-6α,16β-dimethyl-Δ¹,⁴-pregnadiene-17α,21-diol-3,11,20-trione.

12. 2-formyl-16α-methyl-6α-fluoro-Δ¹,⁴-pregnadiene-17α,21-diol-3,11,20-trione.

13. 2-formyl-16β-methyl-6α-fluoro-Δ¹,⁴-pregnadiene-17α,21-diol-3,11,20-trione.

14. 2-formyl-9α-fluoro-Δ¹,⁴-pregnadiene-17α,21-diol-3,11,20-trione.

15. 2-formyl-6α,9α-difluoro-Δ¹,⁴-pregnadiene-16α,17α,21-triol-3,11,20-trione.

16. 2-formyl-6α-chloro-9α-fluoro-Δ¹,⁴-pregnadiene-17α,21-diol-3,11,20-trione.

17. 2-formyl-16α-methyl-6α,9α-difluoro-Δ¹,⁴-pregnadiene-17α,21-diol-3,11,20-trione.

18. 2-formyl-16β-methyl-6α,9α-difluoro-Δ¹,⁴-pregnadiene-17α,21-diol-3,11,20-trione.

19. A compound of the following formula:

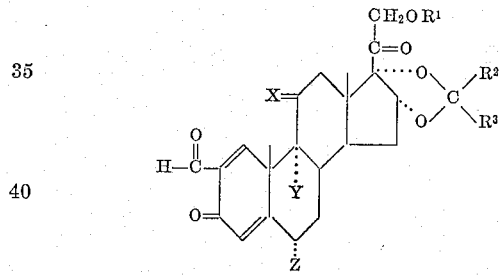

wherein X is selected from the group consisting of β-hydroxy and keto; Y is a member of the group consisting of hydrogen, fluorine and chlorine; Z is selected from the group consisting of hydrogen, fluorine, chlorine and methyl; R¹ is selected from the group consisting of hydrogen and a hydrocarbon carboxylic acyl group of less than 12 carbon atoms and R² and R³ are hydrocarbon radicals of up to 8 carbon atoms.

20. A process for the production of 2-formyl-Δ¹,⁴-pregnadien-3-one derivatives which comprises treating the corresponding 2-hydroxymethylene-Δ⁴-pregnen-3-one compound with a dehydrogenating agent in an inert organic solvent at room temperature for a period of time of 1 to 10 minutes.

21. The process of claim 20 wherein the dehydrogenating agent is 2,3-dichloro-5,6-dicyano-1,4-benzoquinone and the solvent is dioxane.

No references cited.

UNITED STATES PATENT OFFICE
CERTIFICATE OF CORRECTION

Patent No. 3,124,573            March 10, 1964

Albert Bowers et al.

It is hereby certified that error appears in the above numbered patent requiring correction and that the said Letters Patent should read as corrected below.

Column 1, lines 30 to 45, the formula should appear as shown below instead of as in the patent:

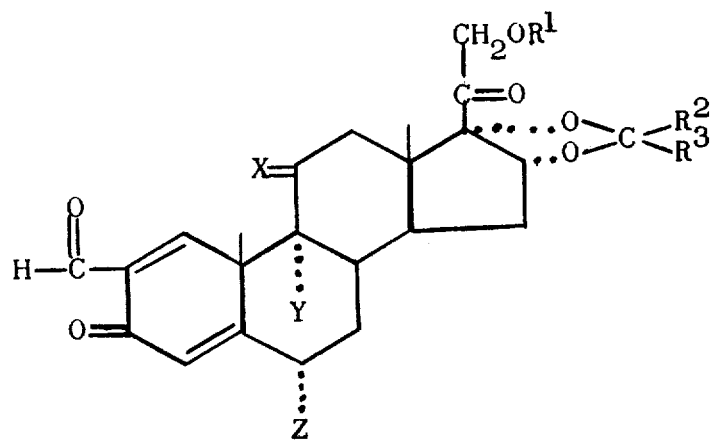

Signed and sealed this 14th day of July 1964.

(SEAL)
Attest:

ESTON G. JOHNSON
Attesting Officer

EDWARD J. BRENNER
Commissioner of Patents